(12) United States Patent
Jourdan

(10) Patent No.: US 12,487,070 B2
(45) Date of Patent: Dec. 2, 2025

(54) MICROSYSTEM FOR MEASURING ROTATIONAL MOVEMENT AND MEASUREMENT DEVICE THEREFOR

(71) Applicant: COMMISSARIAT A L'ENERGIE ATOMIQUE ET AUX ENERGIES ALTERNATIVES, Paris (FR)

(72) Inventor: Guillaume Jourdan, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 476 days.

(21) Appl. No.: 18/083,026

(22) Filed: Dec. 16, 2022

(65) Prior Publication Data

US 2023/0194236 A1 Jun. 22, 2023

(30) Foreign Application Priority Data

Dec. 17, 2021 (FR) ........................................ 2113767

(51) Int. Cl.
*G01B 7/16* (2006.01)
(52) U.S. Cl.
CPC ...................................... *G01B 7/18* (2013.01)
(58) Field of Classification Search
None
See application file for complete search history.

(56) References Cited

U.S. PATENT DOCUMENTS

| 8,375,788 B2 * | 2/2013 | Robert | G01C 19/574 |
| | | | 73/504.12 |
| 2021/0095949 A1 * | 4/2021 | Gattere | H01G 5/16 |

FOREIGN PATENT DOCUMENTS

EP 2 491 406 B1 9/2016

OTHER PUBLICATIONS

Search Report as issued in French Patent Application No. FR2113767, dated Jul. 25, 2022.
Miani, T., et al., "Resonant Accelerometers Based on Nanomechanical Piezoresistive Transduction," 2021 IEEE 34th International Conference on Micro Electro Mechanical Systems (MEMS), Jan. 2021, pp. 192-195. doi: 10.1109/MEMS51782.2021.9375287.
Robert, P., et al., "M&NEMS: A new approach for ultra-low cost 3D inertial sensor," 2009 IEEE Sensors, Oct. 2009, pp. 963-966. doi: 10.1109/ICSENS.2009.5398195.

* cited by examiner

*Primary Examiner* — Eric S. McCall
*Assistant Examiner* — Nigel H Plumb
(74) *Attorney, Agent, or Firm* — Pillsbury Winthrop Shaw Pittman LLP

(57) ABSTRACT

A microsystem includes a substrate; a main part connected to the substrate via an anchor; a moving part configured to rotate about an axis of rotation O; a first beam connecting the moving part to the main part, the main direction of said first beam being along a first vector $e_{j1}$ having as origin the junction of the moving part with the first beam and in the sense of the main part; a second beam connecting the moving part to the main part, the main direction of the second beam being along a second vector $e_{j2}$ having as origin the junction of the moving part with the second beam and in the sense of the main part.

17 Claims, 9 Drawing Sheets

[Fig. 1]
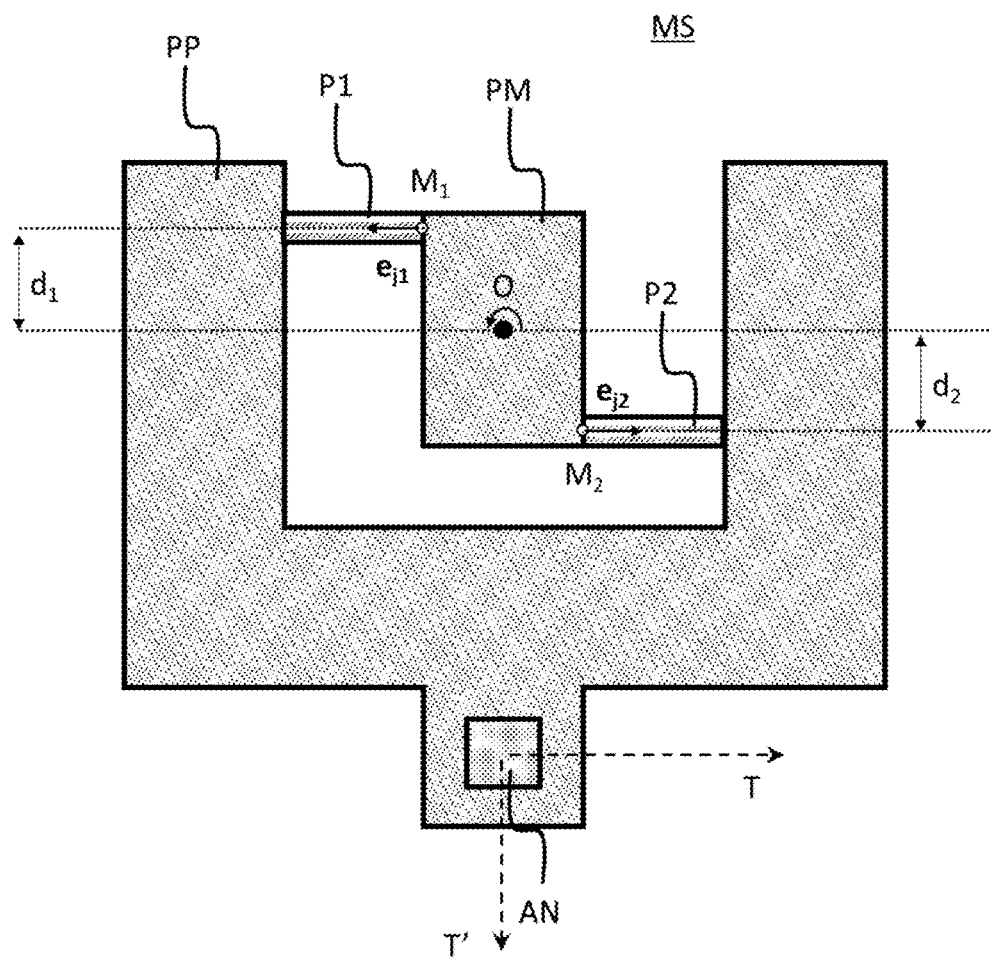

[Fig. 2]
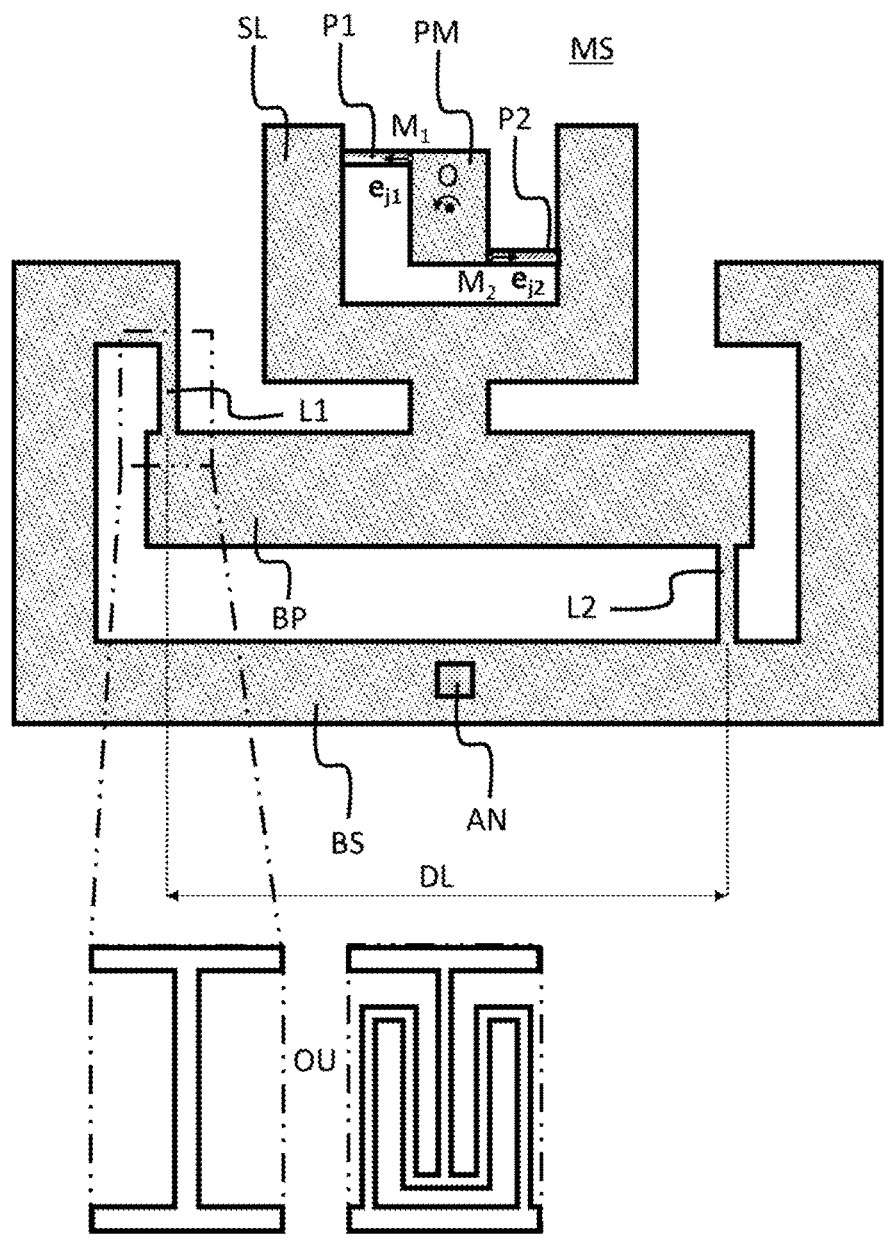

[Fig. 3]
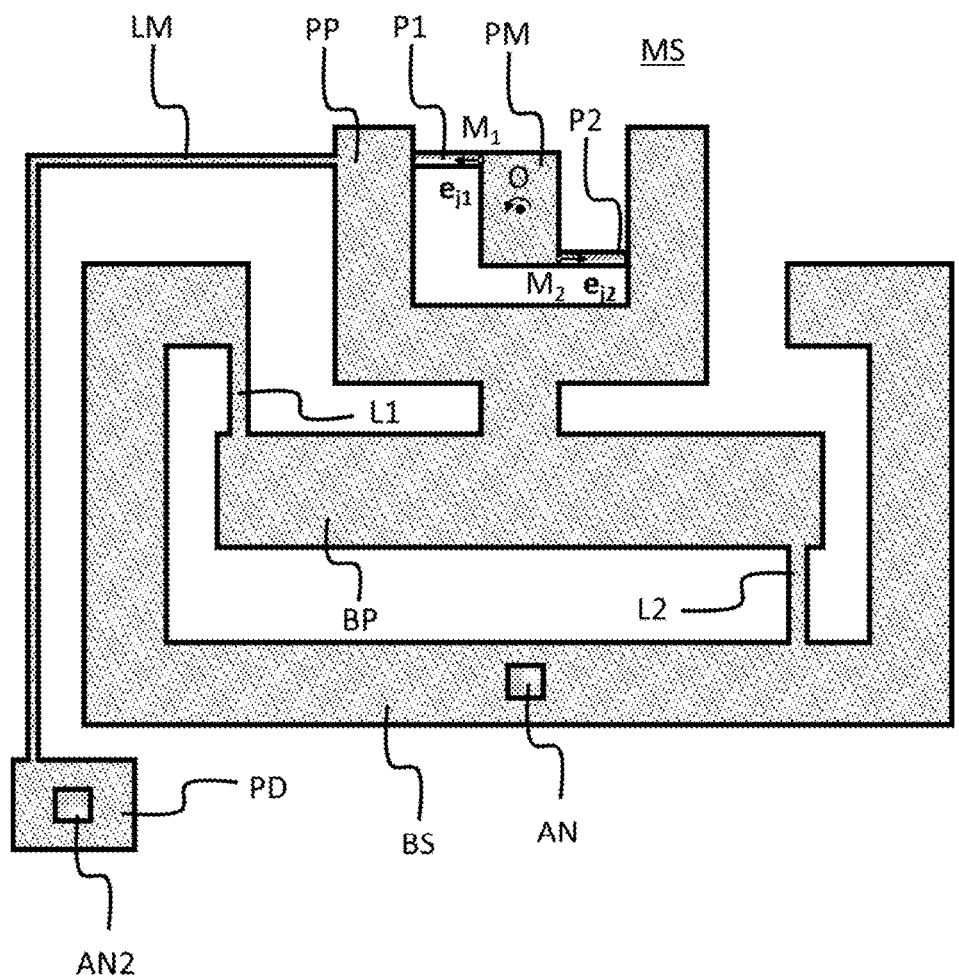

[Fig. 4]
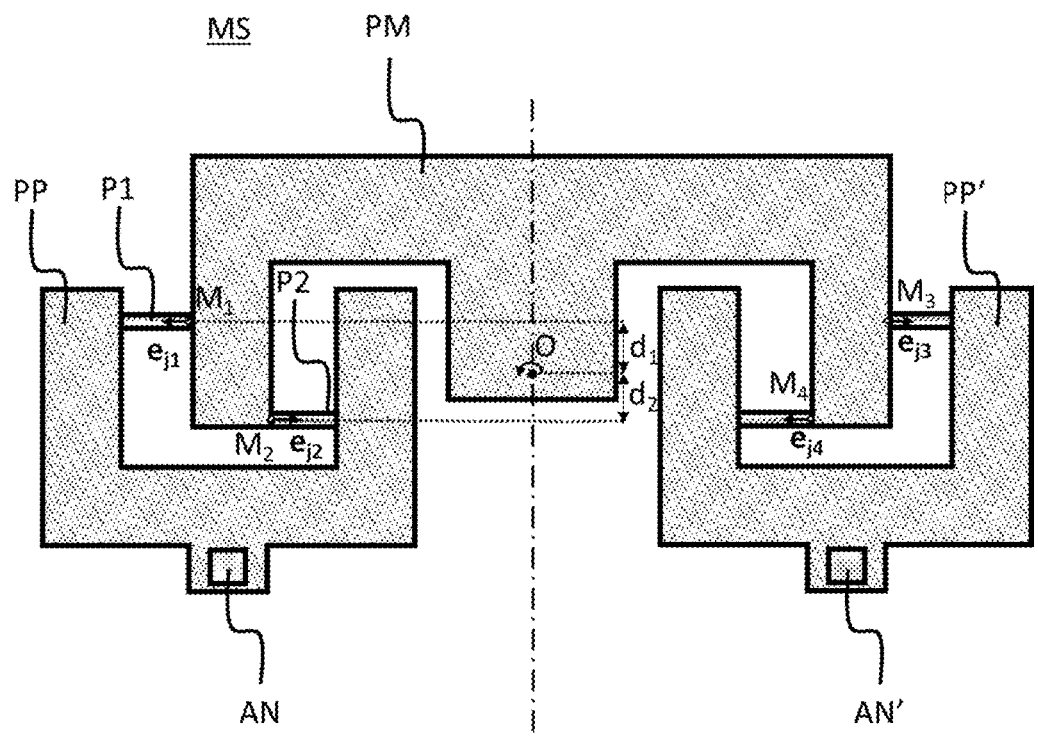

[Fig. 5]
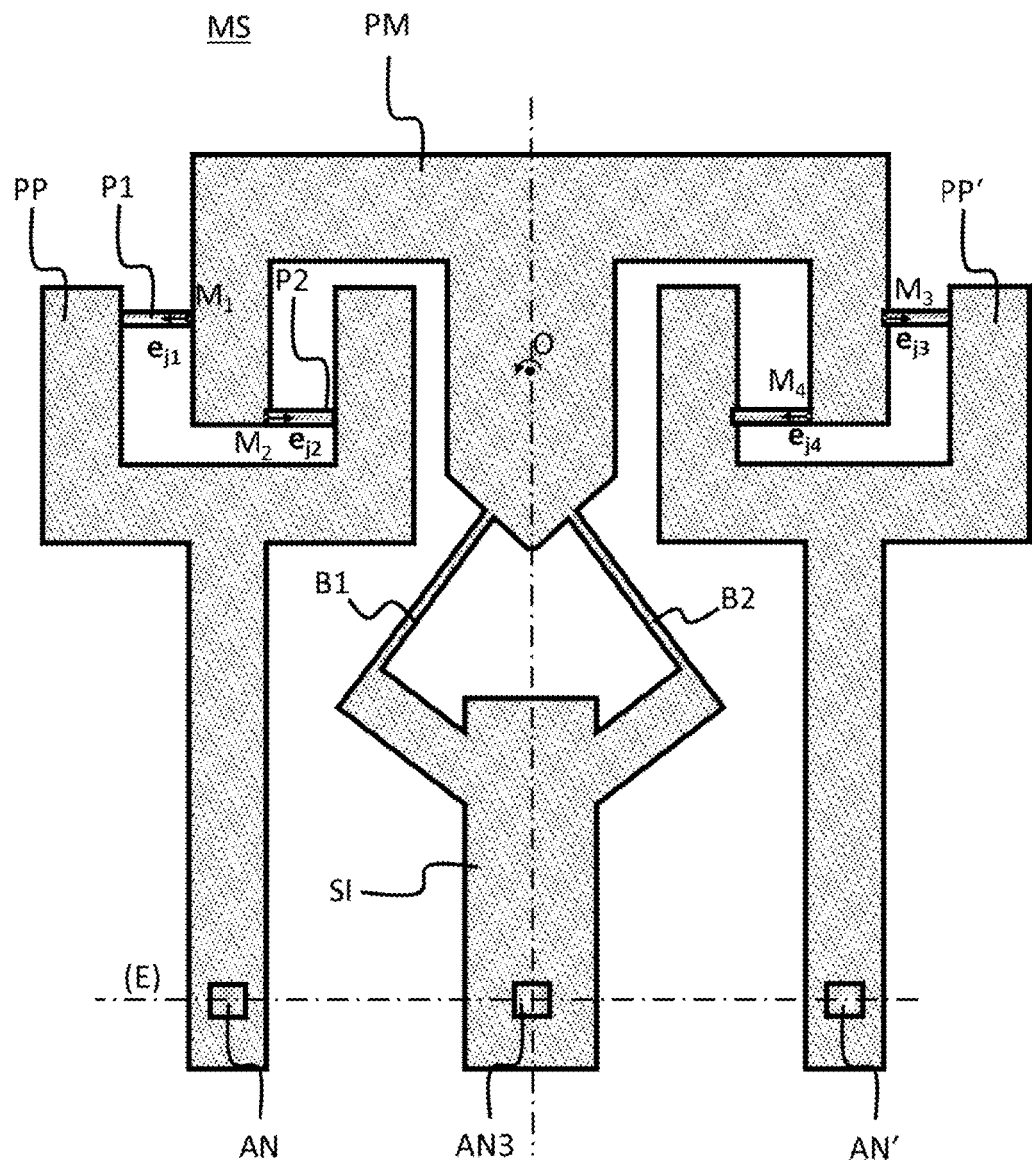

[Fig. 6]
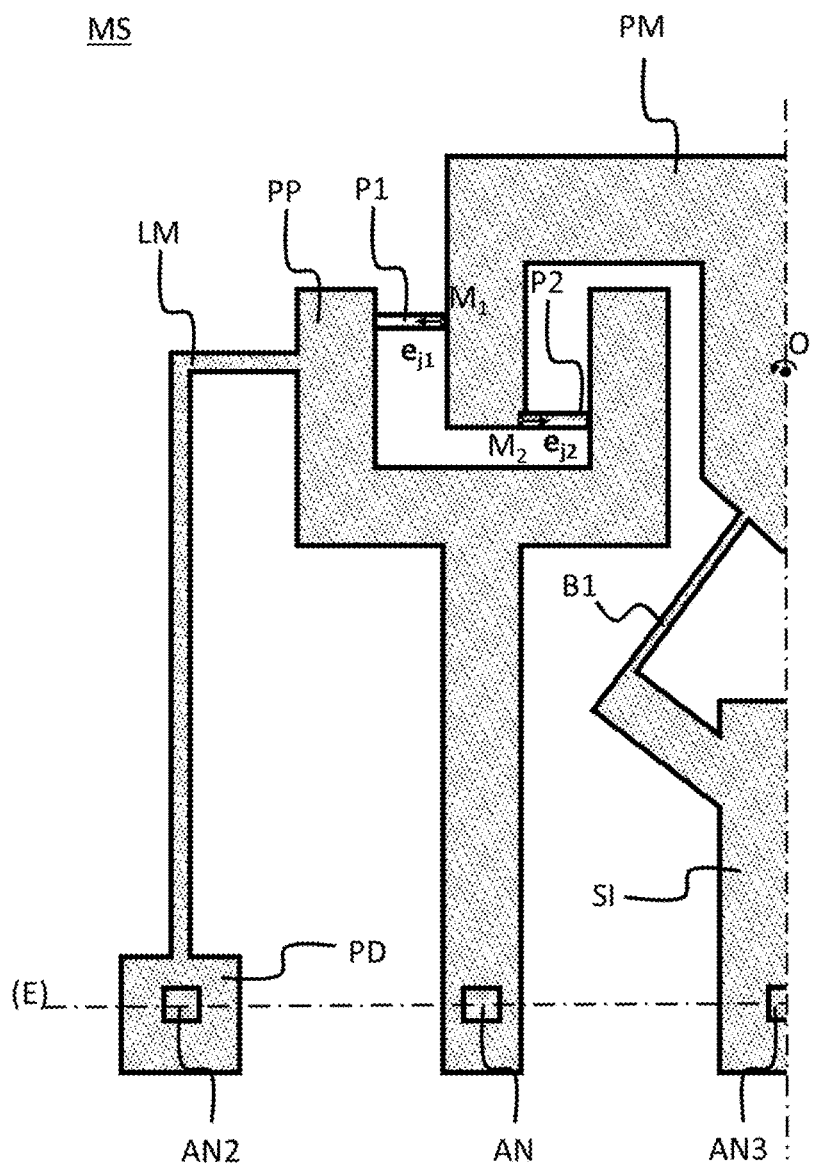

[Fig. 7A]
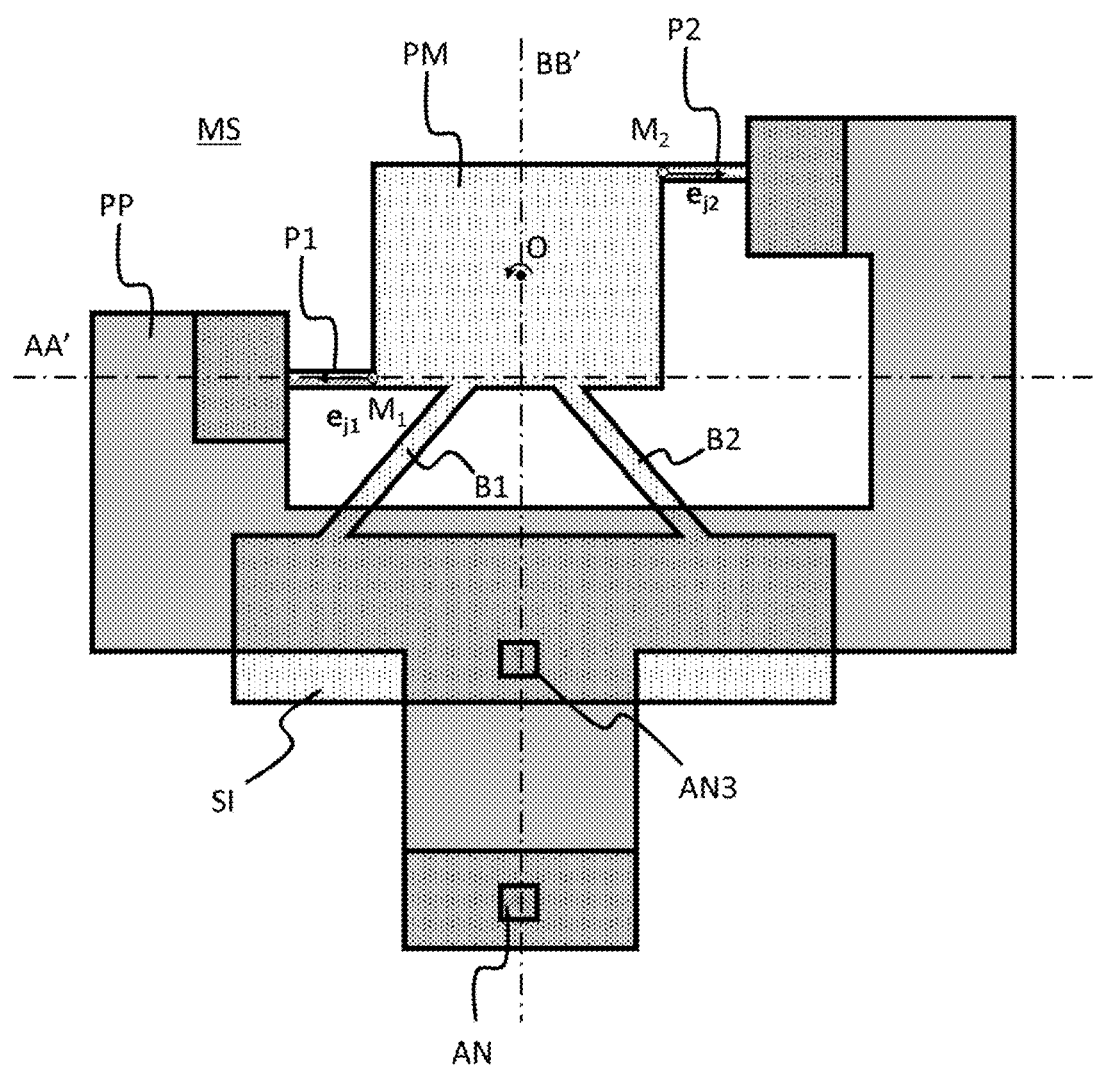

[Fig. 7B]
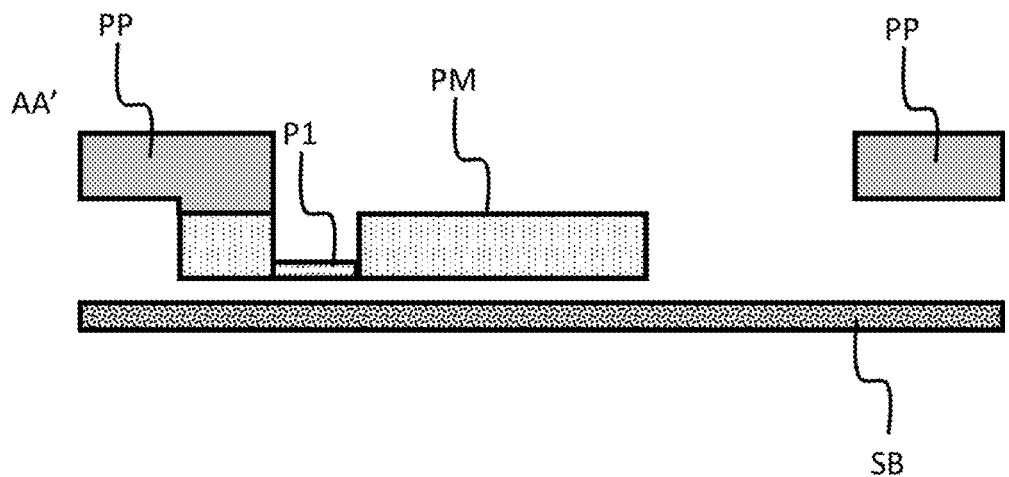
[Fig. 7C]
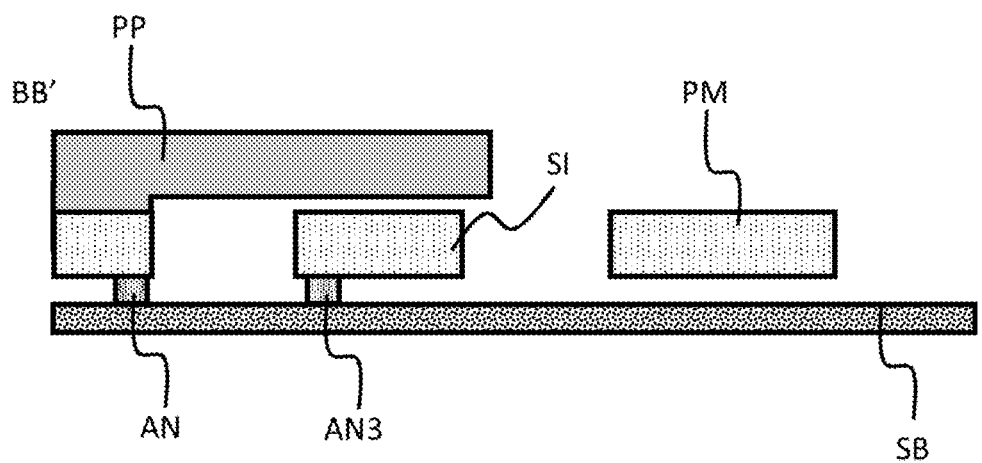

[Fig. 8]
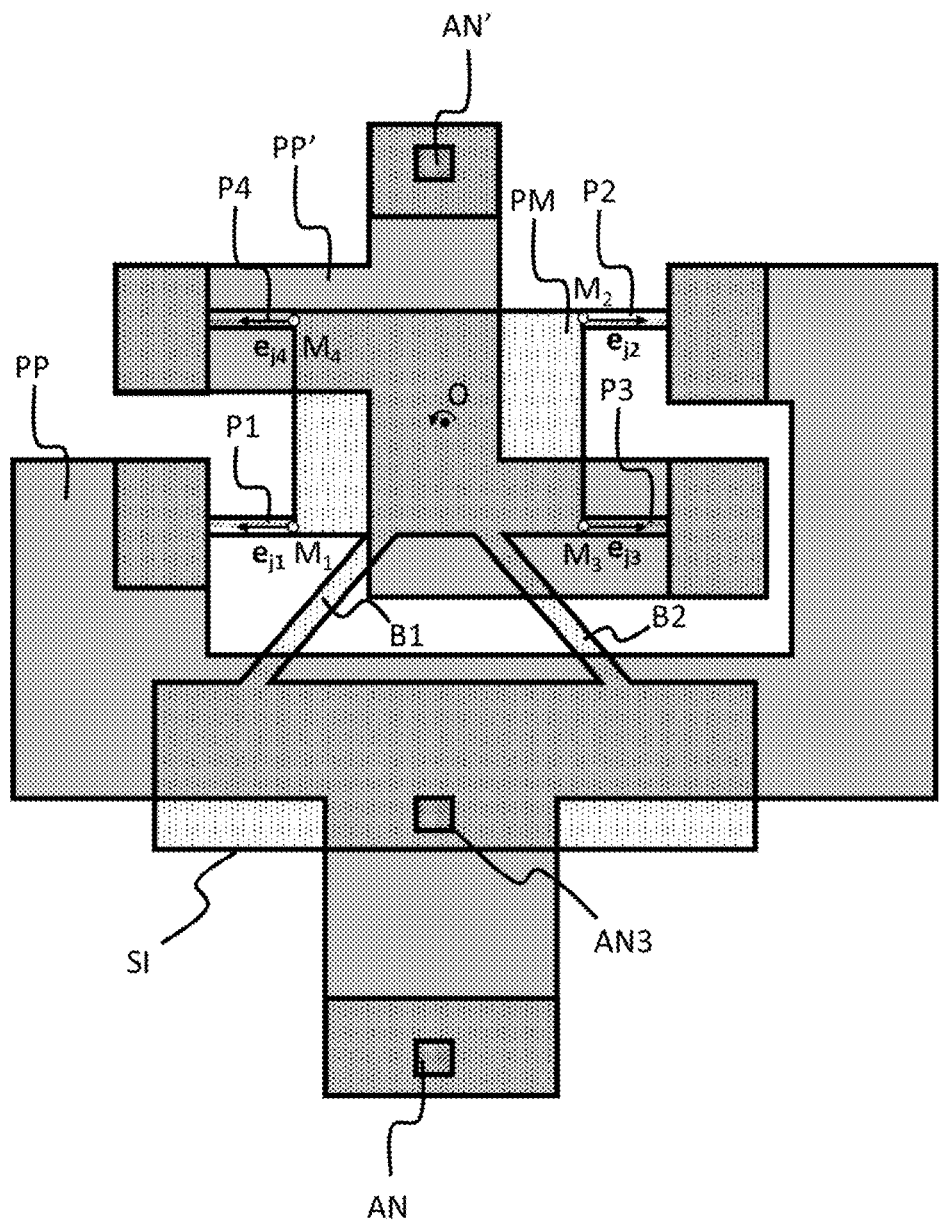

MICROSYSTEM FOR MEASURING ROTATIONAL MOVEMENT AND MEASUREMENT DEVICE THEREFOR

CROSS-REFERENCE TO RELATED APPLICATIONS

This application claims priority to French Patent Application No. 2113767, filed Dec. 17, 2021, the entire content of which is incorporated herein by reference in its entirety.

FIELD

The field of the invention is that of microsystems.

The present invention relates to a microsystem for measuring rotational movement and in particular to a microsystem with reduced sensitivity to deformations of the substrate on which the microsystem is made.

BACKGROUND

It is known to measure rotational movements by means of microsystems. For this, a suspended moving part with an axis of rotation connected to a fixed part via one or more beams (serving as strain gauges) is generally used, the fixed part being itself rigidly connected to a substrate.

However, such a structure is relatively sensitive to substrate deformations. More particularly, deformation of the substrate will cause a translational movement between the fixed part and the moving part, thus translationally deforming the beams, the latter thereby resulting in providing a spurious signal. In practice, the sensitivity to such spurious signals depends on the position of the anchors and is generally aggravated by the phenomenon of stress amplification which concentrates deformation at the beams. Such a structure is also sensitive to thermal expansion and in particular thermal expansion at the beams which can cause a rotational movement of the moving part and thus a spurious signal.

Thus, there is a need for a structure that reduces sensitivity to substrate deformation or even thermal expansion, especially at the beams.

SUMMARY

In the following, the "direction" of the vector defines a line along which lies the vector and the "sense" defines the sense along the line the vector is pointing to. Two vectors can have the same "direction" but opposite "sense". The invention offers a solution to the problems previously discussed by providing a structure which, due to its symmetry, makes it possible to reduce influence of substrate deformation or even thermal expansion on the signal measured.

An aspect of the invention relates to a microsystem comprising:
- a substrate;
- a main part connected to the substrate via an anchor;
- a moving part, the moving part being configured to rotate about an axis of rotation O;
- a first beam connecting the moving part to the main part, the main direction of said first beam being along a first vector $e_{j1}$ having as origin the junction $M_1$ of the moving part with the first beam and in the sense of the main part;
- a second beam connecting the moving part to the main part, the main direction of said second beam being along a second vector $e_{j2}$ having as origin the junction $M_2$ of the moving part with the second beam and in the sense of the main part.

Moreover, the first vector $e_{j1}$ and the second vector $e_{j2}$ have the same direction and are of opposite sense, the position of the junctions $M_1$ and $M_2$ being chosen so that the vector product $OM_1 \wedge e_{j1}$ and the vector product $OM_2 \wedge e_{j2}$ have the same sign.

The structure thus obtained is of low sensitivity to deformations of the substrate, the deformation of the beams induced by such a deformation being opposite and the signals associated with these deformations at each beam thus cancelling each other out during the measurement carried out by a device for measuring rotation using a microsystem according to an embodiment of the invention. It is also of low sensitivity to the effects of thermal expansion at the microstructure or even at each beam, which, given the symmetry of the microsystem, produce opposing thermoelastic forces. More particularly, the sensitivity of the microsystem beams to substrate deformations has a direct impact on the stability of sensors using such microsystems and on the thermal sensitivity of their TCO (Temperature Coefficient of Offset). The substrate is indeed subject to various relaxation and expansion phenomena due in particular to packaging (behaviour of adhesives, for example) and to mounting conditions (transfer of mechanical stress) in a system.

In addition to the characteristics just discussed in the preceding paragraph, the microsystem according to a first aspect of the invention may have one or more of the following additional characteristics, considered individually or according to any technically possible combination.

In an embodiment, the first beam (P1) and the second beam (P2) are made of a piezoresistive material.

In an embodiment, the first beam (P1) and the second beam (P2) are made of p-doped or n-doped silicon.

In an embodiment, the distance $OM_1$ projected along the vector $e_{j1}$ is less than or equal to five times the distance $OM_1$ projected along an axis perpendicular to $e_{j1}$ and in the plane of the moving part PM and/or the distance $OM_2$ projected along the vector $e_{j2}$ is less than or equal to five times the distance $OM_2$ projected along an axis perpendicular to $e_{j2}$ and in the plane of the moving part PM.

In an embodiment, the material of the first beam and the second beam have the same Young's modulus and the following relationships are verified:

$$\frac{S_1 l_2}{S_2 l_1} = \frac{d_2}{d_1}$$

where $l_1$ is the length of the first beam, $l_2$ is the length of the second beam, $d_1$ is the distance from the first beam to the point of rotation along an axis perpendicular to $e_{j1}$, $d_2$ is the distance of the second beam from the point of rotation along an axis perpendicular to $e_{j2}$, $S_1$ is the cross-sectional area of the first beam and $S_2$ is the cross-sectional area of the second beam.

In an embodiment, the material of the first beam and the second beam have a same resistivity and a same Young's modulus and the following relationships are verified:

$$\frac{l_1}{l_2} = \frac{d_2}{d_1} \; et \; \frac{s_1}{s_2} = \left(\frac{d_2}{d_1}\right)^2$$

where $l_1$ is the length of the first beam, $l_2$ is the length of the second beam, $d_1$ is the distance from the first beam to the point of rotation along an axis perpendicular to $e_{j1}$, $d_2$ is the distance of the second beam from the point of rotation along an axis perpendicular to $e_{j2}$, $S_1$ is the cross-sectional area of the first beam and $S_2$ is the cross-sectional area of the second beam. In an embodiment, $l_1=l_2$.

In an embodiment, the main part comprises:
a connection structure to which the first and second beams are connected;
a primary arm rigidly connected to the connection structure;
a secondary arm (BS) connected to the substrate by the anchor;
the secondary arm (BS) being connected to the primary arm (BP) via at least a first connection (L1) having a main direction perpendicular to $e_{j1}$ or $e_{j2}$ and a second connection (L2) having a main direction perpendicular to $e_{j1}$ or $e_{j2}$.

In an embodiment, the main part is referred to as the first main part, the microsystem comprising:
a second main part connected to the substrate via an anchor;
a third beam connecting the moving part to the second main part, the main direction of said third beam being along a third vector $e_{j3}$ having as origin the junction $M_3$ of the moving part with the third beam and in the sense of the second main part;
a fourth beam connecting the moving part to the second main part, the main direction of said fourth beam being along a fourth vector $e_{j4}$ having as origin the junction $M_4$ of the moving part with the fourth beam and in the sense of the second main part.

Furthermore, the third vector $e_{j3}$ and the fourth vector $e_{j4}$ have the same direction and are of opposite sense, the position of the junctions $M_3$ and $M_4$ being chosen so that the vector product $OM_3 \wedge e_{j3}$ and the vector product $OM_4 \wedge e_{j4}$ have the same sign and are opposite in sign to $OM_1 \wedge e_{j1}$ and $OM_2 \wedge e_{j2}$.

In this way, the four beams are in "push-pull" mode (in other words they work in an opposite way—when the first and second beams are in compression, the third and fourth beams are in extension and vice versa) and it is thus possible to compensate, at least in part, for thermal expansion effects.

In an embodiment, $e_{j1}=-e_{j3}$ and $e_{j2}=-e_{j4}$.

In an embodiment, the anchor of the second main part is identical to the anchor of the first main part.

In an embodiment, the third beam is the symmetrical image of the first beam in an axial symmetry along an axis in the plane of the moving part passing through the axis of rotation O and perpendicular to $e_{j1}$ and the fourth beam is the symmetrical image of the second beam in an axial symmetry along an axis in the plane of the moving part passing through the axis of rotation O and perpendicular to $e_{j2}$.

In an embodiment, the axis of rotation O is offset from the first beam and the second beam.

In an embodiment, the microsystem comprises a detection tray connected to the substrate via a second anchor, said detection tray being connected to the main part, at the connection structure where such a structure exists, by a mechanical connection, the mechanical connection and the detection tray being configured to allow measurement of the electrical potential in the vicinity of the first beam and the second beam.

A second aspect of the invention relates to a device for measuring rotation using a microsystem according to a first aspect of the invention, the device comprising a measurement device configured to measure the deformation $\varepsilon_1$ of the first beam and the deformation $\varepsilon_2$ of the second beam, and a device configured to determine the angle of rotation of the moving part from these two deformations.

In addition to the characteristics just discussed in the preceding paragraph, the device according to a second aspect of the invention may have one or more of the following additional characteristics, considered individually or in any technically possible combination.

In an embodiment, the measurement device is configured to perform a four-point measurement.

In one embodiment, the device comprises a calculation system configured to determine the rotation from the useful signal obtained using the following relationship:

$$S=|\alpha_2|\varepsilon_1+|\alpha_1|\varepsilon_2$$

where S is the useful signal, $\alpha_1$ is a proportionality coefficient between a relative displacement of the moving part along the vector $e_{j1}$ with respect to the main part and the deformation of the first beam, $\alpha_2$ is a proportionality coefficient between a relative displacement of the moving part along the vector $e_{j2}$ with respect to the main part and the deformation of the second beam. The deformation $\varepsilon_1$ is the deformation of the first beam along the vector $e_{j1}$ and $\varepsilon_2$ is the deformation of the second beam along the vector $e_{j2}$.

The invention and its different applications will be better understood upon reading the following description and examining the accompanying figures.

BRIEF DESCRIPTION OF THE FIGURES

The figures are set forth by way of indicating and in no way limiting purposes for the invention.

FIG. 1 shows a microsystem according to a first embodiment.

FIG. 2 shows a microsystem according to a second embodiment.

FIG. 3 shows a microsystem according to a third embodiment.

FIG. 4 shows a microsystem according to a fourth embodiment.

FIG. 5 shows a microsystem according to a fifth embodiment.

FIG. 6 shows a microsystem according to a sixth embodiment.

FIG. 7A, FIG. 7B and FIG. 7C show a microsystem according to a seventh embodiment.

FIG. 8 shows a microsystem according to an eighth embodiment.

DETAILED DESCRIPTION

Unless otherwise specified, a same element appearing in different figures has a unique reference. Furthermore, in the following description, although the state of stress for a given deformation depends on the temperature and insofar as, within the context of the invention, the temperature is a priori the same on the two (or four, etc.) beams, the terms stress and deformation will both be used to describe mechanical state of the system (one being proportional to the other).

FIG. 1 shows a schematic representation of a microsystem MS according to an embodiment of the invention, generally intended for use in a rotation measurement device. This microsystem MS comprises a substrate (not represented), a main part PP connected to the substrate via an anchor AN and a moving part PM configured to rotate about an axis of rotation O, said axis O being perpendicular to the surface of the moving part PM. This axis of rotation O may, for example, be obtained using an anchor AN3 connecting the moving part to the substrate, possibly using an intermediate structure, and allowing rotation of this moving part PM relative to the substrate about this axis O.

The microsystem MS according to an embodiment of the invention also comprises at least two beams P1,P2 (or strain gauges): a first beam P1 and a second beam P2.

The first beam P1 connects the moving part PM to the main part PP, the main direction PP of said first beam P1 being along a first vector $e_{j1}$ having as origin the junction $M_1$ of the moving part PM with the first beam P1 and in the sense of the main part PP.

The second beam P2 connects the moving part PM to the main part, the main direction of said second beam being along a second vector $e_{j2}$ having as origin the junction of the main part with the second beam $M_2$ and in the sense of the fixed part. The first beam P1 and second beam P2 are intended to act as a strain gauge.

Furthermore, the first vector and the second vector have the same direction, are of opposite sense, and the vector product $OM_1 \wedge e_{j1}$ and the vector product $OM_2 \wedge e_{j2}$ have the same sign (in other words, the same sense).

Thus, in the MS microsystem according to an embodiment of the invention, the measurand $s_m$ generates a rotation $\theta$ of the moving part PM about the axis of rotation O, this rotation leading the first beam P1 and the second beam P2 into a state of compression so that the deformation $\varepsilon_1$ of the first beam P1 and the deformation $\varepsilon_2$ of the second beam P2 are of the same sign.

In an embodiment, the distance $OM_1$ projected along the vector $e_{j1}$ is less than or equal to five times the distance $OM_1$ projected along an axis perpendicular to $e_{j1}$ and in the plane of the moving part PM and/or the distance $OM_2$ projected along the vector $e_{j2}$ is less than or equal to five times the distance $OM_2$ projected along an axis perpendicular to $e_{j2}$ and in the plane of the moving part PM.

In an exemplary embodiment, the first beam P1 and the second beam P2 have a length (measured along the main axis of the beam in question) of between 1 μm and 500 μm, for example 5 μm.

In an exemplary embodiment, the first beam P1 and the second beam P2 have a width (measured along an axis perpendicular to the main axis and in the plane of the moving part PM) and a thickness (measured along an axis perpendicular to the plane of the moving part PM) between 50 nm and 50 μm, for example 250 nm.

In an exemplary embodiment, the thickness (measured along an axis perpendicular to the plane of the moving part PM) of the main part PP or the moving part PM is between 100 nm and 100 μm, an in an embodiment between 10 μm and 20 μm.

Rejection of the Deformation Signal

In order to illustrate one of the benefits of a microsystem MS according to the invention, let us assume, in a first example, a deformation of the substrate leading to a translation T (illustrated in [FIG. 1]) of the anchor AN in the same direction and the same sense as the vector $e_{j2}$ so as to modify position of the anchor AN with respect to the point of rotation O. Thus, the first beam P1 is put in compression while the second beam P2 is put in extension so that $\varepsilon_1 = -\varepsilon_2$. Thereby, the signal provided by the beams P1,P2 adds up destructively so that the total deformation of the beams P1,P2 associated with the deformation of the substrate $\varepsilon_c^{de} = \varepsilon_1 + \varepsilon_2$ is zero. Methods for measuring the deformation of the beams P1,P2 and thus for converting this deformation into a signal will be detailed in the following by way of illustration, these methods being otherwise well known to the person skilled in the art and easy to adapt to the microsystem MS according to the invention.

Thus, in the case of a translation T of the anchor AN in the same sense as the vector $e_{j2}$, the microsystem MS according to the invention provides a rejection to the displacement signal of the anchors produced by the deformation of the substrate.

In a second example, a deformation of the substrate causes a translation of the anchor AN in a direction T' (shown in [FIG. 1]) in the plane of the moving part PM and perpendicular to the vector $e_{j2}$ so as to change position of the anchor AN with respect to the axis of rotation O. In this second example, the first beam P1 and the second beam P2 do not undergo any 1-order deformation so that $\varepsilon_1 = \varepsilon_2 \approx 0$. Thus, also in this example, the microsystem MS according to the invention provides a rejection to the displacement signal of the anchor AN (at least at 1-order).

Note that any deformation in the plane of the moving part PM is a combination of both translations T,T' described above and that therefore, at 1-order, such a deformation results in a rejection of the deformation signal.

General Treatment of a Deformation α

In the general case, the deformations of the first beam P1 and the second beam P2 are given by:

$$\begin{cases} \varepsilon_1 = \alpha_1 a + \beta_1 s_m \\ \varepsilon_2 = \alpha_2 a + \beta_2 s_m \end{cases} \quad \text{[Math. 1]}$$

Where α is the relative displacement between the main part PP and the moving part PM projected along the main direction of the beam considered (that is along $e_{j1}$ or $e_{j2}$), $\alpha_{1/2}$ is a proportionality coefficient between the relative displacement in the main direction of the beam considered and the deformation of the beam considered and $\beta_{1/2}$ is a proportionality coefficient between the measurand $s_m$ and the deformation of the beam considered. As has been previously shown, in a microsystem according to the invention, $\alpha_1$ and $\alpha_2$ are of opposite sign while $\beta_1$ and $\beta_2$ are of the same sign. Thus, it is possible to reject the signal due to displacement using the following equation:

$$S = |\alpha_2|\varepsilon_1 + |\alpha_1|\varepsilon_2 \propto s_m \quad \text{[Math. 2]}$$

where S is the useful signal. Thus, this combination allows access to the useful signal while rejecting the spurious signal associated with the deformation α.

Measurement of Beam Deformation

At least two principles are known for measuring the state of deformation or stress in a beam.

The first principle is based on the measurement of the resonant frequency of a bending mode of the beam P1,P2 considered. Such a measurement generally requires an actuator in order to vibrate the beam P1,P2 (e.g. capacitive or thermoelastic actuating system, etc.) and a reader for reading at each beam P1,P2 (e.g. a capacitive or piezoresistive device, etc.) the transverse movement of the beam considered. The stress or deformation is then determined using the following relationship:

$$\varepsilon \propto \frac{df}{f} \quad \text{[Math. 3]}$$

Where f is the resonant frequency of the beam, df is the variation of this resonant frequency and ε is the deformation or stress in the beam considered.

This principle is for example described in T. Miani et al, "Resonant Accelerometers Based on Nanomechanical Piezoresistive Transduction" in 2021 IEEE 34th International Conference on Micro Electro Mechanical Systems (MEMS), January 2021, pp. 192-195. doi: 10.1109/MEMS51782.2021.9375287.

The second principle is based on the measurement of the resistance of the beam P1 considered, which depends on the state of stress by a piezoresistive effect (Silicon, Germanium, etc.). Usually, such a resistance measurement requires, for each resistor, the presence of electrical circuits isolated from the other measurement circuits. The stress or deformation is then measured using the following relationship:

$$\varepsilon \propto \frac{dR}{R} \qquad \text{[Math. 4]}$$

Where R is the resistance of the beam considered and dR is the variation of this resistance.

Thus, separate measurements of frequency or resistance allow access to the signal S previously introduced and thus to the measurand $s_m$. In the following, the resistance measurement will be used in order to determine the useful signal.

This principle is for example described in P. Robert et al, "*M&NEMS: A new approach for ultra-low cost 3D inertial sensor*" in 2009 *IEEE Sensors*, October 2009, pp. 963-966. doi: 10.1109/ICSENS.2009.5398195 or in document EP2491406 B1.

When a resistance measurement is used, then the microsystem MS according to an embodiment of the invention also comprises electrical tracks configured to be able to apply a voltage or a current to the beams P1,P2 of the microsystem and measure the current flowing through said beams or the voltage at both ends of said beams P1,P2.

Single Resistance Measurement

In an embodiment, the microsystem according to the invention is configured so that a single current measurement provides access to the deformation of the beams, and thus to the measurand $s_m$.

As a reminder, the conductance G of the two beams P1,P2 corresponding to the parallel connection of a first resistor $R_1$ associated with the first beam P1 and a second resistor $R_2$ associated with the second beam P2, is given by:

$$G = \frac{1}{R_1} + \frac{1}{R_2} \qquad \text{[Math. 5]}$$

Furthermore, the resistance of a beam P1,P2 can be related to the deformation or stress in it by the following relationship:

$$\frac{dR_1}{R_1} = \pi_\varepsilon \varepsilon_1 \; et \; \frac{dR_2}{R_2} = \pi_\varepsilon \varepsilon_2 \qquad \text{[Math. 6]}$$

Where $\pi_\varepsilon$ is a conversion coefficient between the stress or deformation of a beam P1,P2 and the strength of said beam P1,P2. From these two relationships and by differentiating equation 5, the following relationship can be derived:

$$dG = -\pi_\varepsilon \left( \frac{\varepsilon_1}{R_1} + \frac{\varepsilon_2}{R_2} \right) \qquad \text{[Math. 8]}$$

Where dG is the conductance variation.

In order to allow proper measurement, in this embodiment, the microsystem MS is configured so that a displacement a of the anchor does not generate any rotational movement of the moving part. In other words, the torque induced by this displacement should be zero at the moving part PM. This condition can be formulated as:

$$d_1 k_1 = d_2 k_2 \qquad \text{[Math. 9]}$$

with $d_1$ the distance to the pivot of the first beam P1, $d_2$ the distance to the pivot of the second beam P2 (see [FIG. 1]), $k_1$ is the longitudinal stiffness of the first beam P1 and $k_2$ is the longitudinal stiffness of the second beam P2.

Given that the longitudinal stiffness of a beam is given by $k = E S_p / l$ where E is the Young's modulus of the material of which the beam is made, $S_p$ is the cross-sectional area of the beam and l is the length of the beam, the previous relationship can be rewritten as follows:

$$\frac{S_1 l_2}{S_2 l_1} = \frac{d_2}{d_1} \qquad \text{[Math. 10]}$$

Where $S_1$ is the cross-sectional area of the first beam P1, $S_2$ is the cross-sectional area of the second beam P2, $l_1$ is the length of the first beam P1 and $l_2$ is the length of the second beam P2 (it is assumed that both beams P1, P2 are made of the same material).

In an embodiment, the first beam P1 and the second beam P2 have the same resistivity ρ. Thus, equation 8 becomes:

$$dG = -\frac{\pi_\varepsilon}{\rho} \left( S_1 \frac{\varepsilon_1}{l_1} + S_2 \frac{\varepsilon_2}{l_2} \right) \qquad \text{[Math. 11]}$$

Furthermore, given the relationships previously described, $\varepsilon_1 = -\alpha/l_1$ and $\varepsilon_2 = \alpha/l_2$. In other words, in absolute values, the deformation or stress is proportional to the displacement a and inversely proportional to the length of the beam considered P1,P2. Thus, to cancel sensitivity of dG to the displacement α, in equation 11, the following relationship is verified:

$$\frac{S_1}{(l_1)^2} = \frac{S_2}{(l_2)^2}$$

Stated differently, in this embodiment, the dimensions of the first beam P1 and the second beam P2 are chosen such that:

$$\frac{l_1}{l_2} = \frac{d_2}{d_1} \; et \; \frac{S_1}{S_2} = \left( \frac{d_1}{d_2} \right)^2 \qquad \text{[Math. 12]}$$

For example, it is possible to set $d_1$ and $d_2$ and then to dimension the first beam P1 and the second beam P2 according to the ratio of these values.

In a beneficial embodiment, these two dimensions are chosen such that $d_1 = d_2$. Thus, $l_1 = l_2$ and $S_1 = S_2$. Under these conditions, $$\varepsilon_1 = \frac{-a - d_1\theta}{l_1} \text{ and } \varepsilon_2 = \frac{\mp a - d_2\theta}{l_2}$$

where θ is the angle of rotation of the moving part PM, and the following relations are verified:

$$\frac{dG}{G} = -\frac{dR}{R} = \pi_\varepsilon \frac{d_1\theta}{l_1} = \pi_\varepsilon \frac{d_2\theta}{l_2} \quad \text{[Math. 13]}$$

It is thus possible, from a measurement of the conductance G to access the angle of rotation θ of the moving part without having to measure the resistance of each individual beam.

Decoupling of Substrate Stresses

In order to further limit the influence of the deformations on the measured signal, it may be desirable to decouple a section (hereafter referred to as the connecting section SL) from the main part PP of the anchor AN while allowing this section to have sufficient rigidity so that a rotation of the moving part PM causes the deformation of the first beam P1 or the second beam P2.

For this, in an embodiment illustrated in [FIG. 2] or [FIG. 3], the main part PP comprises a connection structure SL to which the first beam P1 and the second beam P2 are connected. It also comprises a primary arm BP rigidly connected to the connection structure SL. The main part PP also comprises a secondary arm BS connected to the substrate via the anchor AN associated with the main part PP. Finally, the secondary arm is connected to the primary arm via at least a first connection L1 and a second connection L2, the first connection L1 having a main direction perpendicular to $e_{j1}$ or $e_{j2}$ and the second connection L2 having a main direction perpendicular to $e_{j1}$ or $e_{j2}$ so as to give the primary arm BP a degree of translational freedom in a direction parallel to the main direction of the first beam P1 or of the second beam P2.

Furthermore, the longitudinal stiffness of the first connection L1 and the second connection L2 is very high compared to the longitudinal stiffness of the first beam P1 and the second beam P2 and the transverse stiffness (in the plane of the moving part) of the first connection L1 and the second connection L2 is very low compared to the longitudinal stiffness of the first beam P1 and the second beam P2. Thus, the primary arm BP has a high rotational stiffness and the connection structure SL (rigidly connected to the primary arm BP) will not be driven upon rotation of the moving part PM.

In an embodiment, the distance DL projected along an axis parallel to $e_{j1}$ or $e_{j2}$ separating the first connection L1 (or the second connection L2) from the axis of rotation O1 is such that $$L \gg \sqrt{\frac{k_{P1}}{k_{L1}}} d_1$$

for example $$L \geq 4\sqrt{\frac{k_{P1}}{k_{L1}}} d_1$$

where $k_{P1}$ is the longitudinal stiffness of the first beam P1, $k_{L1}$ is the longitudinal stiffness of the first connection and $d_1$ the distance separating the first beam P1 from the axis of rotation O1.

In an embodiment, the number of connections between the primary arm BP and the secondary arm BS is greater than two, for example equal to four, said connections being configured so that the primary arm BP has a high rotational stiffness and thus the connection structure SL (rigidly connected to the primary arm BP) is not driven upon rotation of the moving part PM.

As illustrated in [FIG. 2], the connections L1, L2 connecting the secondary arm BS to the primary arm BP can be of a relatively simple geometry, such as a rectilinear beam (on the left in [FIG. 2]), or even a more complex structure, such as a spring-forming beam (on the right in [FIG. 2]).

The above structure provides several benefits. Firstly, if the substrate is pre-stressed, it does enable the first beam P1 and the second beam P2 to be unbalanced, the deformation being essentially absorbed by the connections L1, L2 connecting the main arm BP to the secondary arm BS. Secondly, it reinforces protection against possible deformations of the substrate. In addition, upon rotation of the moving part PM, the improved structure allows a so-called "pure" torque to be obtained in the case where the rotation gauge is balanced (namely the beams P1, P2 are symmetrical).

Four-Point Measurement

In an embodiment illustrated in [FIG. 3], the microsystem MS comprises at least one measurement tray PD connected to the substrate by a second anchor AN2, said measurement tray PD being connected to the main part PP, for example via the connection structure SL when the latter exists, by a mechanical connection LM, for example a beam, the mechanical connection LM and the measurement tray PD being configured to allow measurement of the electric potential in the vicinity of the first beam P1 and/or the second beam P2. Furthermore, the stiffness of the mechanical connection LM in both directions of the plane of the moving part PM is very low (for example at least ten times lower, or even at least one hundred times lower) than the longitudinal stiffness of the first beam P1 and the second beam P2. Similarly, the mechanical stiffness of the connection LM in the two directions of the plane of the moving part PM is very low (for example at least ten times lower, or even one hundred times lower) than the stiffness in the same directions of the main part PP to which the connection LM is connected with respect to the anchor of said main part PP.

In an embodiment, the anchor AN of the main part PM and the second anchor AN2 are aligned along an axis parallel to the vector $e_{j1}$ or $e_{j2}$.

In general, when the resistance RSL between the junction of the main part PP with the first beam P1 and the junction of the main part PP with the second beam P2 is much lower (e.g. at least five times lower) than the resistance of the first beam P1 or of the second beam P2, then a measurement tray PD is sufficient to obtain a proper measurement of the resistance of the beams P1, P2. For example, in this configuration, the junction of the mechanical connection LM with the main part PP is located at equal distance from the junction of the main part PP with the first beam P1 and the junction of the main part PP with the second beam P2.

When this condition is not fulfilled, the microsystem comprises, for example, a measurement tray connected via an anchor to the substrate and a mechanical connection for each beam P1,P2 of the microsystem, the junction of the main part PP with the mechanical connection associated with each beam P1,P2 being then located as close as possible to the junction of the main part PP with said beam P1,P2. Thus, the measurement can be performed as close as possible to each beam P1,P2.

Thus, it is possible to perform a four-point measurement of the electrical resistance of the first beam P1 and/or the second beam P2. This configuration is particularly beneficial when combined with the presence of a main part PP comprising a primary arm BP and a secondary arm BS, the presence of the primary arm BP, the secondary arm BS and the connections L1, L2 connecting the latter being likely to add a non-negligible spurious resistance in a conventional measurement scheme (that is without the use of a four-point measurement).

Additional Beams

In an embodiment, the microsystem comprises a third beam P3 and a fourth beam P4. In this embodiment, the main part PP is referred to as the first main part PP. Furthermore, the microsystem MS comprises a second main part PP' connected to the substrate via an anchor AN'.

Furthermore, the third beam P3 connects the moving part PM to the second main part PP', the main direction of the third beam P3 being along a third vector $e_{j2}$ having as origin the junction $M_2$ of the moving part PM with the third beam P3 and as direction the second main part PP'.

Furthermore, the fourth beam P4 connects the moving part PM to the second main part PP', the main direction of said fourth beam P4 being along a fourth vector $e_{j4}$ having as origin the junction $M_4$ of the moving part PM with the fourth beam P4 and as sense the second main part PP'.

Furthermore, the third vector $e_{j3}$ and the fourth vector $e_{j4}$ have the same direction and are of opposite sense, the position of the junctions M1 and M2 being chosen such that the vector product $OM_3 \wedge e_{j3}$ and the vector product $OM_4 \wedge e_{j4}$ have the same sign and are opposite in sign to $OM_1 \wedge e_{j1}$ and $OM_2 \wedge e_{j2}$. In other words, the first beam P1, the second beam P2, the second beam P3 and the fourth beam P4 are configured such that, upon rotation of the moving part PM, when this rotation causes a compression (respectively an extension) of the first beam P1 and the second beam P2 then it causes an extension (respectively a compression) of the third beam P3 and the fourth beam P4. In an embodiment, $e_{j1}=-e_{j3}$ and $e_{j2}=-e_{j4}$.

In the figures, the vectors $e_{j1}$ and $e_{j3}$ and the vectors $e_{j2}$ and $e_{j4}$ have the same direction. However, this is only one particular embodiment and these vectors may have different directions.

In an embodiment (not illustrated), the anchor of the second main part PP' is identical to the anchor AN of the first main part PP (in other words, the first main part PP and the second main part PP have the same anchor). This configuration is particularly adapted when the measurement of the resistance of the beams P1-P4 (and therefore of the stress state thereof) is done by measuring the resonant frequency, but can also be implemented when the measurement of the resistances is an electrical measurement on the condition that the measurement circuits associated with each beam P1-P4 are isolated. Alternatively, the anchor AN' of the second main part PP' is different from the anchor of the first main part PP. Although less beneficial in terms of structure, this configuration is easier to implement when the measurement of the resistance of beams P1-P4 is an electrical measurement.

In an embodiment, the third beam P3 is the symmetrical image of the first beam P1 in an axial symmetry along an axis in the plane of the moving part PM passing through the axis of rotation O and perpendicular to $e_{j1}$ and the fourth beam P4 is the symmetrical image of the second beam P2 in an axial symmetry along an axis in the plane of the moving part PM passing through the axis of rotation O and perpendicular to $e_{j2}$.

Offset Axis of Rotation

In an embodiment illustrated in [FIG. 4], [FIG. 5] and [FIG. 6], the axis of rotation O is offset from the first beam P1, the second beam P2, the third beam P3 and the fourth beam P4. By offset with respect to the first beam P1 and the second beam P2, it is meant that the axis of rotation is not located between a first axis perpendicular to the vector $e_{j1}$ and passing through the point M1 and a second axis perpendicular to the vector $e_{j2}$ and passing through the point M2, the first axis and the second axis being in the plane of the moving part PM (a similar definition can be derived for the third beam P3 and the fourth beam P4). It can be demonstrated that, in case of rotation of the moving part PM, the longitudinal deformation at the first beam P1 and the second beam P2 is identical whatever the distance DC projected along an axis parallel to $e_{j1}$ or $e_{j2}$ separating the first beam P1 and the second beam P2 from the axis of rotation O. A same demonstration can be made for the longitudinal deformation at the third beam P3 and the fourth beam P4. Furthermore, upon rotation of the moving part, the deformation at the first beam P1 and the second beam P2 is opposite to the deformation at the third beam P3 and the fourth beam P4. It will be noted that, as illustrated in [FIG. 4] and [FIG. 5], when the axis of rotation is offset and the technological stack comprises only one MEMS layer, it is possible to use a common moving part PM for several (here two—the second one being on the right in the figures) main parts PP,PP', at least one pair of beams P1,P2,P3,P4 being then associated with each main part PP, PP' and disposed according to the teachings of the present invention.

In an embodiment illustrated in [FIG. 5] and [FIG. 6] (but also in [FIG. 7A] and [FIG. 8] described later), the axis of rotation O can be obtained an intermediate structure SI connected to the substrate a third anchor AN3 and to the moving part PM by a first arm B1 and a second arm B2. Furthermore, the first arm B1 and the second arm B2 are connected to the moving part PM so as to allow rotation of the latter along the axis O. In a beneficial embodiment, the longitudinal stiffness of the first arm B1 and the second arm B2 is at least five times greater than the longitudinal stiffness of the first beam P1 or the second beam P2 (i.e. at least five times greater than the greatest of the longitudinal stiffnesses of the beams P1, P2). Furthermore, in this embodiment, the first arm B1 and the second arm B2 have a torsional stiffness (i.e. the moment produced by the arm considered when a rotation is imposed thereto) smaller than the rotational stiffness with respect to point O produced by the first beam P1 or the second beam P2. As a reminder, for the first beam P1 for example, the rotational stiffness with respect to point O is given by $k_{P1}d_1^2$ (this formula is easily generalisable for any beam or arm).

In an embodiment shown in [FIG. 5] and [FIG. 6], the anchor AN of the main part PM and the third anchor AN3 are aligned along an axis (E) parallel to the vector $e_{j1}$ or $e_{j2}$.

In the example of [FIG. 6], the microsystem also comprises a measurement tray PD and a mechanical connection as described previously, and the second anchor AN2 connecting the measurement tray PD to the substrate is also aligned along the axis (E).

The alignment of the different anchors AN,AN2,AN3 along a same axis (E) makes it possible to further reduce effects of substrate deformation.

Multi-Level Configuration

In the preceding examples, most of the microsystem MS is produced on one and the same level, such level then being connected to the substrate via one or more anchors AN, AN2, AN3. However, it is possible to make a microsystem MS according to the invention on a plurality of levels.

For this, in an embodiment shown in [FIG. 7A] to [FIG. 7C], the microsystem MS is made on at least three levels. In the example given in [FIG. 7A] to [FIG. 7C], the main part PP is made on a first level, while the moving part PM, the first arm B1, the second arm B2 and the intermediate structure SI are made in a second level different from the first level (see cross-section AA' in [FIG. 7B] and cross-section BB' in [FIG. 7C]). The first and second levels are further connected to the substrate SB via anchors AN,AN3. As shown in [FIG. 7A] to [FIG. 7C], the use of a plurality of levels allows, for example, the use of an intermediate structure SI to obtain the axis of rotation O without having to offset said axis of rotation (as in the embodiment of [FIG. 5] and [FIG. 6]).

Device for Measuring a Rotational Movement

A second aspect of the invention relates to a device for measuring rotation using a microsystem MS according to a first aspect of the invention. More particularly, the device comprises a measurement device configured to measure the deformation $\varepsilon_1$ of the first beam P1 and the deformation $\varepsilon_2$ of the second beam P2. In an embodiment, the measurement device is configured to perform a four-point measurement.

The measurement device also comprises a calculation system (for example a processor or an ASIC card) associated with a non-transitory memory comprising instructions necessary to implement the measurement device and in particular to determine the angle of rotation of the moving part from these two deformations. When the instructions are read by the processor, the calculation system is adapted to carry out its functions.

In an embodiment, the measurement device is configured to provide a signal proportional to the combination of the deformation states of each beam. For example, measuring the overall resistance of two beams in parallel provides, in the first order, a signal proportional to the sum of the deformation states of the two beams.

In an alternative embodiment, the measurement device is configured to independently measure deformation states of each of the beams, for example with reading of the mechanical resonant frequency of each beam.

As already mentioned, these measurement devices are known from the state of the art and will not be detailed here. However, the reader can refer to the following two documents (already cited), which are incorporated herein by reference, and the references they cite:

T. Miani et al, "Resonant Accelerometers Based on Nanomechanical Piezoresistive Transduction" in 2021 IEEE 34th International Conference on Micro Electro Mechanical Systems (MEMS), January 2021, pp. 192-195. doi: 10.1109/MEM551782.2021.9375287;

P. Robert et al, "M&NEMS: A new approach for ultra-low cost 3D inertial sensor" in 2009 IEEE Sensors, October 2009, pp. 963-966. doi: 10.1109/ICSENS.2009.5398195 or even in document EP2491406 B1.

In an embodiment, the calculation system is configured to determine rotation of the moving part from the following expression (already introduced, see [Math. 3]):

$$S = |\alpha_2|\varepsilon_1 + |\alpha_1|_2 \propto s_m \qquad \text{[Math. 14]}$$

Where, as a reminder, S is the useful signal, $\alpha_1$ is a proportionality coefficient between a relative displacement of the moving part PM along the vector $e_{j1}$ with respect to the main part PP and the deformation of the first beam P1, $\alpha_2$ is a proportionality coefficient between a relative displacement of the moving part PM along the vector $e_{j2}$ with respect to the main part PP and the deformation of the second beam P1, deformation $\varepsilon_1$ is the deformation of the first beam P1 along the vector $e_{j1}$ and $\varepsilon_2$ is the deformation of the second beam P2 along the vector $e_{j2}$, the deformations being determined using the measurement device of the device.

Thus, this combination allows access to the useful signal while rejecting the spurious signal associated with the deformation.

The invention claimed is:

1. A microsystem comprising:
   a substrate;
   a main part connected to the substrate via an anchor;
   a moving part configured to rotate about an axis of rotation O;
   a first beam connecting the moving part to the main part, a main direction of said first beam being along a first vector $e_{j1}$ having as origin a junction $M_1$ of the moving part with the first beam and as direction the main part;
   a second beam connecting the moving part to the main part, the main direction of said second beam being along a second vector $e_{j2}$ having as origin a junction $M_2$ of the moving part with the second beam and as direction the main part;
   wherein the first vector $e_{j1}$ and the second vector $e_{j2}$ have the same direction and are of opposite sense, a position of the junctions $M_1$ and $M_2$ being chosen so that the vector product $O'M1^{\wedge}e_{j1}$ and the vector product $O'M_2^{\wedge}e_{j2}$ have the same sign, where O' is a point of intersection between the axis of rotation O and a plane perpendicular to said axis containing the first vector $e_{j1}$ and the second vector $e_{j2}$, the first and second beams being connected to the anchor via the main part.

2. The microsystem according to claim 1, wherein the first beam and the second beam are made of a piezoresistive material.

3. The microsystem according to claim 2, wherein the first beam and the second beam are made of p-doped or n-doped silicon.

4. The microsystem according to claim 1, wherein a distance $OM_1$ projected along the vector $e_{j1}$ is less than or equal to five times the distance $OM_1$ projected along an axis perpendicular to $e_{j1}$ and in the plane of the moving part and/or a distance $OM_2$ projected along the vector $e_{j2}$ is less than or equal to five times the distance $OM_2$ projected along an axis perpendicular to $e_{j2}$ and in the plane of the moving part.

5. The microsystem according to claim 1, wherein the material of the first beam and the second beam have a same Young's modulus and the following relationships are verified:

$$\frac{S_1 l_2}{S_2 l_1} = \frac{d_2}{d_1}$$

where $l_1$ is a length of the first beam, $l_2$ is a length of the second beam, $d_1$ is a distance that separates the first beam from the point of rotation about an axis perpendicular to $e_{j1}$, $d_2$ is a distance that separates the second beam from the point of rotation about an axis perpendicular to $e_{j2}$, $S_1$ is the cross-sectional area of the first beam and $S_2$ is the cross-sectional area of the second beam.

6. The microsystem according to claim 1, wherein a material of the first beam and the second beam have a same resistivity and a same Young's modulus and the following relationships are verified:

$$\frac{l_1}{l_2} = \frac{d_2}{d_1} \text{ et } \frac{S_1}{S_2} = \left(\frac{d_2}{d_1}\right)^2$$

where $l_1$ is a length of the first beam, $l_2$ is a length of the second beam, $d_1$ is a distance that separates the first beam from the point of rotation about an axis perpendicular to $e_{j1}$, $d_2$ is a distance that separates the second beam from the point of rotation about an axis perpendicular to $e_{j2}$, $S_1$ is the cross-sectional area of the first beam and $S_2$ is the cross-sectional area of the second beam.

7. The microsystem according to claim 6, wherein $l_1=l_2$.

8. The microsystem according to claim 1, wherein the main part comprises:
- a connection structure to which the first beam and the second beam are connected;
- a primary arm rigidly connected to the connection structure;
- a secondary arm connected to the substrate via the anchor;
- the secondary arm being connected to the primary arm via at least a first connection having a main direction perpendicular to $e_{j1}$ or $e_{j2}$ and a second connection having a main direction perpendicular to $e_{j1}$ or $e_{j2}$.

9. The microsystem according to claim 1, wherein the main part is referred to as the first main part, the microsystem comprising:
- a second main part connected to the substrate via an anchor;
- a third beam connecting the moving part to the second main part, the main direction of said third beam being along a third vector $e_{j3}$ having as origin the junction $M_3$ of the moving part with the third beam and as sense the second main part;
- a fourth beam connecting the moving part to the second main part, the main direction of said fourth beam being along a fourth vector $e_{j4}$ having as origin the junction $M_4$ of the moving part with the fourth beam and as sense the second main part;
- the third vector $e_{j3}$ and the fourth vector $e_{j4}$ having the same direction and being of opposite sense, the position of the junctions $M_3$ and $M_4$ being chosen so that the vector product $QM_3\char`^e_{i3}$ and the vector product $QM4\char`^e_{j4}$ have the same sign and are of opposite sign to $OM_1\char`^e_{j1}$ and $OM2\char`^e_{j2}$.

10. The microsystem according to claim 9, wherein $e_{j1}=-e_{j3}$ and $e_{j2}=-e_{j4}$.

11. The microsystem according to claim 9, wherein the anchor of the second main part is identical to the anchor of the first main part.

12. The microsystem according to claim 9, wherein the third beam is the symmetrical image of the first beam in axial symmetry along an axis in the plane of the moving part passing through the axis of rotation O and perpendicular to $e_{j1}$ and the fourth beam is the symmetrical image of the second beam in axial symmetry along an axis in the plane of the moving part passing through the axis of rotation O and perpendicular to $e_{j2}$.

13. The microsystem according to claim 1, wherein the axis of rotation O is offset from the first beam and the second beam.

14. The microsystem according to claim 1, comprising a measurement tray connected to the substrate via a second anchor, said measurement tray being connected to the main part, at the connection structure when such a structure exists, by a mechanical connection, the mechanical connection and the measurement tray being configured to allow measurement of the electrical potential in a vicinity of the first beam and of the second beam.

15. A device for measuring rotation using a microsystem according to claim 14, said device comprising a measurement device configured to measure a first deformation $\varepsilon_1$ of the first beam and a second deformation 22 of the second beam, and a system configured to determine an angle of rotation of the moving part from the first and second deformations, wherein the measurement device is configured to perform a four-point measurement.

16. A device for measuring rotation using a microsystem according to claim 1, said device comprising a measurement device configured to measure a first deformation $\varepsilon_1$ of the first beam and a second deformation $\varepsilon_2$ of the second beam, and a system configured to determine an angle of rotation of the moving part from the first and second deformations.

17. The device according to claim 16, comprising a calculation system configured to determine a rotation from a useful signal obtained using the following relationship:

$$S=|\alpha_2|\varepsilon_1+|\alpha_1|\varepsilon_2$$

where S is the useful signal, ai is a proportionality coefficient between a relative displacement of the moving part with respect to the main part and the deformation of the first beam, $\alpha_2$ is a proportionality coefficient between a relative displacement of the moving part with respect to the main part and the deformation of the second beam, deformation $\varepsilon_1$ is the deformation of the first beam and $\varepsilon_2$ is the deformation of the second beam.

* * * * *